United States Patent
Sakaki et al.

(10) Patent No.: US 10,497,013 B2
(45) Date of Patent: Dec. 3, 2019

(54) PURCHASING BEHAVIOR ANALYSIS APPARATUS AND NON-TRANSITORY COMPUTER READABLE MEDIUM

(71) Applicant: FUJI XEROX CO., LTD., Tokyo (JP)

(72) Inventors: Shigeyuki Sakaki, Yokohama (JP); Yasuhide Miura, Yokohama (JP); Tomoki Taniguchi, Yokohama (JP); Tomoko Okuma, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 316 days.

(21) Appl. No.: 15/247,063

(22) Filed: Aug. 25, 2016

(65) Prior Publication Data

US 2017/0278115 A1    Sep. 28, 2017

(30) Foreign Application Priority Data

Mar. 23, 2016 (JP) .................. 2016-058305

(51) Int. Cl.
*G06Q 30/02* (2012.01)
*G06Q 10/10* (2012.01)
*G06Q 50/00* (2012.01)

(52) U.S. Cl.
CPC ..... *G06Q 30/0202* (2013.01); *G06Q 30/0201* (2013.01); *G06Q 50/01* (2013.01)

(58) Field of Classification Search
CPC ......... G06Q 30/02; G06Q 50/01; G06Q 10/10
USPC ...................................................... 705/7.31
See application file for complete search history.

(56) References Cited

U.S. PATENT DOCUMENTS

| 6,032,125 | A | 2/2000 | Ando |
| 2005/0075994 | A1 | 4/2005 | Heh |
| 2013/0231975 | A1* | 9/2013 | High .................. G06Q 30/0201 |
| | | | 705/7.29 |
| 2013/0326375 | A1* | 12/2013 | Barak .................. H04L 65/403 |
| | | | 715/758 |

(Continued)

FOREIGN PATENT DOCUMENTS

| JP | H10-143490 A | 5/1998 |
| JP | 2002082641 A | 3/2002 |
| JP | 2005-115900 A | 4/2005 |

OTHER PUBLICATIONS

"Method for estimating the phase of twitter users' purchasing behavior focused on changing points", DEIM Forum 2015 C4-4.

(Continued)

*Primary Examiner* — Nga B Nguyen
(74) *Attorney, Agent, or Firm* — Oliff PLC

(57) ABSTRACT

A purchasing behavior analysis apparatus includes an acquiring unit that acquires posting information about a specific product from posting information posted to a social networking service; a conversion unit; and an artificial neural network. The artificial neural network includes a first determination layer which determines whether a user is interested in the product, a second determination layer which determines whether the user wants the product, and a third determination layer which determines whether the user is predicted to purchase the product in the future. The purchasing behavior analysis apparatus further includes an interest presence probability calculating unit, a purchase desire probability calculating unit, and a purchase likelihood probability calculating unit.

6 Claims, 15 Drawing Sheets

(56) References Cited

U.S. PATENT DOCUMENTS

| | | | | |
|---|---|---|---|---|
| 2014/0032475 A1* | 1/2014 | Evans | ............... | G06N 5/048 |
| | | | | 706/52 |
| 2014/0244361 A1* | 8/2014 | Zhang | ............... | G06Q 30/0204 |
| | | | | 705/7.33 |
| 2017/0011419 A1* | 1/2017 | Cai | ............... | G06Q 30/0253 |
| 2017/0053208 A1* | 2/2017 | Krishnamurthy | ...... | G06N 5/022 |
| 2017/0169475 A1* | 6/2017 | Korpusik | ............... | G06Q 50/01 |

OTHER PUBLICATIONS

Tsukasa et al. "Customer Behavior Prediction System by Large Scale Data Fusion in a Retail Service" Transactions of the Japanese Society for Artificial Intelligence, vol. 26, No. 6 D, p. 670-681, 2011.

\* cited by examiner

FIG. 4

CORRESPONDENCE RELATIONSHIP BETWEEN
EACH PROCESS IN AIDMA AND PURCHASING
BEHAVIOR PHASES IN THIS EXEMPLARY
EMBODIMENT

| AIDMA | PURCHASING BEHAVIOR PHASE |
|---|---|
| 1. Attenntion | INTEREST PHASE |
| 2. Interest | |
| 3. Desire | PURCHASE DESIRE PHASE |
| 4. Memory | PURCHASE PREDICTION PHASE |
| 5. Action | |

PURCHASING BEHAVIOR PHASE DETERMINATION EXAMPLE 1

| OUTPUT ITEM | OUTPUT VALUE |
|---|---|
| USER IS INTERESTED IN PRODUCT | 0.8 |
| USER IS NOT INTERESTED IN PRODUCT | 0.2 |
| USER WANTS PRODUCT | 0.1 |
| USER DOES NOT WANT PRODUCT | 0.9 |
| USER PURCHASES PRODUCT | 0.2 |
| USER DOES NOT PURCHASE PRODUCT | 0.8 |

IT IS DETERMINED THAT PURCHASING BEHAVIOR PHASE OF USER IS INTEREST PHASE

PURCHASING BEHAVIOR PHASE DETERMINATION EXAMPLE 2

| OUTPUT ITEM | OUTPUT VALUE |
|---|---|
| USER IS INTERESTED IN PRODUCT | 0.8 |
| USER IS NOT INTERESTED IN PRODUCT | 0.2 |
| USER WANTS PRODUCT | 0.9 |
| USER DOES NOT WANT PRODUCT | 0.1 |
| USER PURCHASES PRODUCT | 0.2 |
| USER DOES NOT PURCHASE PRODUCT | 0.8 |

IT IS DETERMINED THAT PURCHASING BEHAVIOR PHASE OF USER IS PURCHASE DESIRE PHASE

PURCHASING BEHAVIOR PHASE DETERMINATION EXAMPLE 3

| OUTPUT ITEM | OUTPUT VALUE |
|---|---|
| USER IS INTERESTED IN PRODUCT | 0.8 |
| USER IS NOT INTERESTED IN PRODUCT | 0.2 |
| USER WANTS PRODUCT | 0.9 |
| USER DOES NOT WANT PRODUCT | 0.1 |
| USER PURCHASES PRODUCT | 0.8 |
| USER DOES NOT PURCHASE PRODUCT | 0.2 |

IT IS DETERMINED THAT PURCHASING BEHAVIOR PHASE OF USER IS PURCHASE PREDICTION PHASE

PURCHASING BEHAVIOR ANALYSIS APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-058305 filed on Mar. 23, 2016.

BACKGROUND

Technical Field

The present invention relates to a purchasing behavior analysis apparatus and a non-transitory computer readable medium.

SUMMARY

According to an aspect of the invention, there is provided a purchasing behavior analysis apparatus including: an acquiring unit that acquires posting information about a specific product from posting information posted to a social networking service; a conversion unit that converts document information included in the posting information acquired by the acquiring unit into a distributed representation; an artificial neural network that includes first determination layer which receives the distributed representation converted by the conversion unit and determines whether a user is interested in the product mentioned in the posting information, a second determination layer which receives an output value from the first determination layer and determines whether the user wants the product, and a third determination layer which receives an output value from the second determination layer and determines whether the user is predicted to purchase the product in the future; an interest presence probability calculating unit that calculates a value indicating probability that the user will be interested in the product mentioned in the posting information based on the output value from the first determination layer; a purchase desire probability calculating unit that calculates a value indicating probability that the user will want the product mentioned in the posting information based on the output value from the second determination layer; and a purchase likelihood probability calculating unit that calculates a value indicating probability that the user will be predicted to purchase the product mentioned in the posting information in the future based on an output value from the third determination layer.

BRIEF DESCRIPTION OF DRAWINGS

Exemplary embodiments of the present invention will be described in detail based on the following figures, wherein:

FIG. 4 is a diagram illustrating a correspondence relationship between each process in AIDMA and purchasing behavior phases in this exemplary embodiment;

DETAILED DESCRIPTION

Hereinafter, exemplary embodiments of the present invention will be described in detail with reference to the drawings.

[First Exemplary Embodiment]

Figure 1:
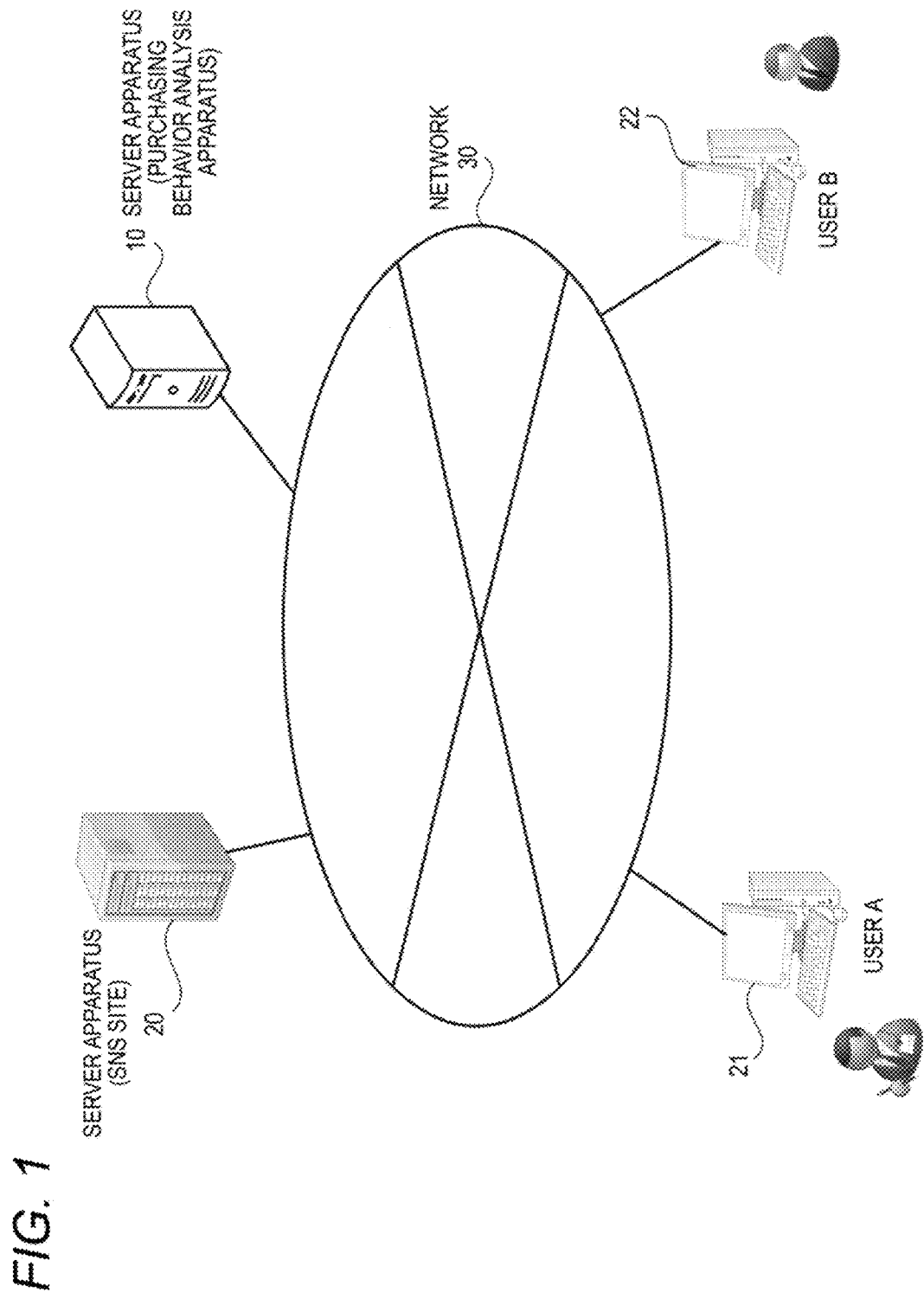
FIG. 1 is a diagram illustrating the structure of a purchasing behavior analysis system according to a first exemplary embodiment of the invention.

FIG. 1 is a diagram illustrating the structure of a purchasing behavior analysis system including a purchasing behavior analysis apparatus 10 according to a first exemplary embodiment of the present invention.

As illustrated in FIG. 1, the purchasing behavior analysis system according to the first exemplary embodiment of the present invention includes a server apparatus 10, a server apparatus 20, and terminal devices 21 and 22 which are connected by a network 30 such as the Internet. Here, the server apparatus 20 is managed by a service provider that provides a social networking service (SNS), such as Twitter (registered trademark), and provides SNS to a large number of users through the network 30.

In this exemplary embodiment, a case in which the purchasing behavior of the user is analyzed based on posting information in Twitter (registered trademark) as an example of SNS will be described. However, the present invention can also be applied to any community-type membership services in which a registered user posts information related to the user to facilitate and support the relation and communication with other users.

For example, the present invention can also be applied to SNS, such as Facebook (registered trademark), so-called blogs, various electronic bulletin boards, and information posting sites.

The terminal devices 21 and 22 are personal computers of general users or users A and B who request the analysis of a specific product purchasing behavior and can access the server apparatus 10 and the server apparatus 20 through the network 30.

The server apparatus 10 is, for example, a purchasing behavior analysis apparatus that is managed by a market research company which analyzes the purchasing behavior of the user for the product requested to be analyzed based on a request from a customer company and analyzes in which of plural purchasing behavior phases each user is, based on posting information posted to SNS. Hereinafter, for example, an operation in a case in which a market research for a specific product is requested by a customer company and information about a user who is interested in the product, a user who wants the product, and a user who is predicted to purchase the product in the future is acquired based on the information posted to SNS will be described.

In FIG. 1, only two users A and B are illustrated. However, in practice, many users are connected to the network 30 and post information to an SNS site or browse the content of the information posted by other users.

Figure 2:
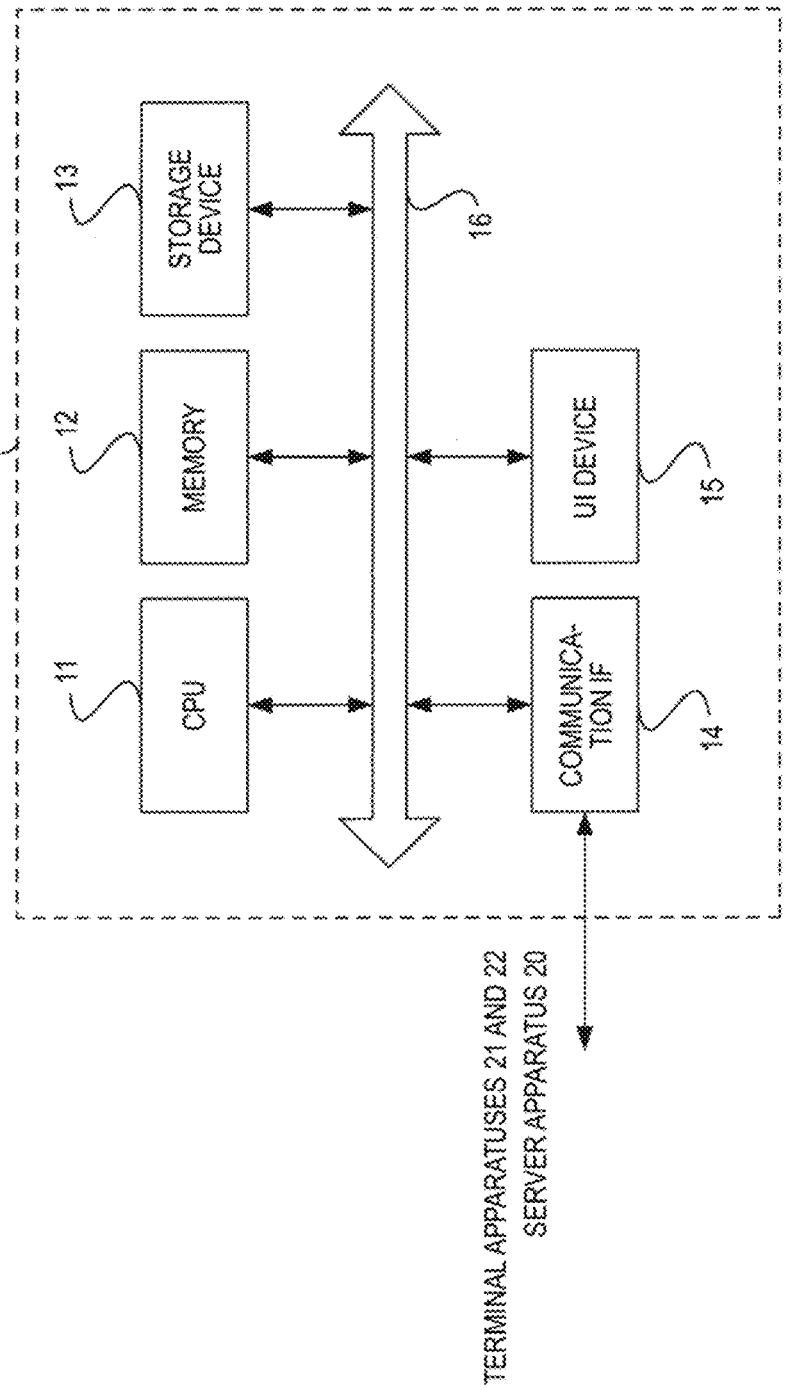
FIG. 2 is a block diagram illustrating the hardware configuration of a server apparatus (purchasing behavior analysis apparatus) according to the first exemplary embodiment of the present invention.

Next, FIG. 2 illustrates the hardware configuration of the server apparatus 10 that functions as the purchasing behavior analysis apparatus in the purchasing behavior analysis system according to this exemplary embodiment.

As illustrated in FIG. 2, the server apparatus 10 includes a CPU 11, a memory 12, a storage device 13, such as a hard disk drive (HDD), a communication interface (IF) 14 that transmits and receives data to and from an external apparatus through the network 30, and a user interface (UI) device 15 including a touch panel or a liquid crystal display and a keyboard. These components are connected to one another through a control bus 16.

The CPU 11 performs a predetermined process based on a control program stored in the memory 12 or the storage device 13 to control the operation of the server apparatus 10. In this exemplary embodiment, the CPU 11 reads the control program stored in the memory 12 or the storage device 13 and executes the control program. However, the program may be stored in a storage medium, such as CD-ROM, and then provided to the CPU 11.

Figure 3:
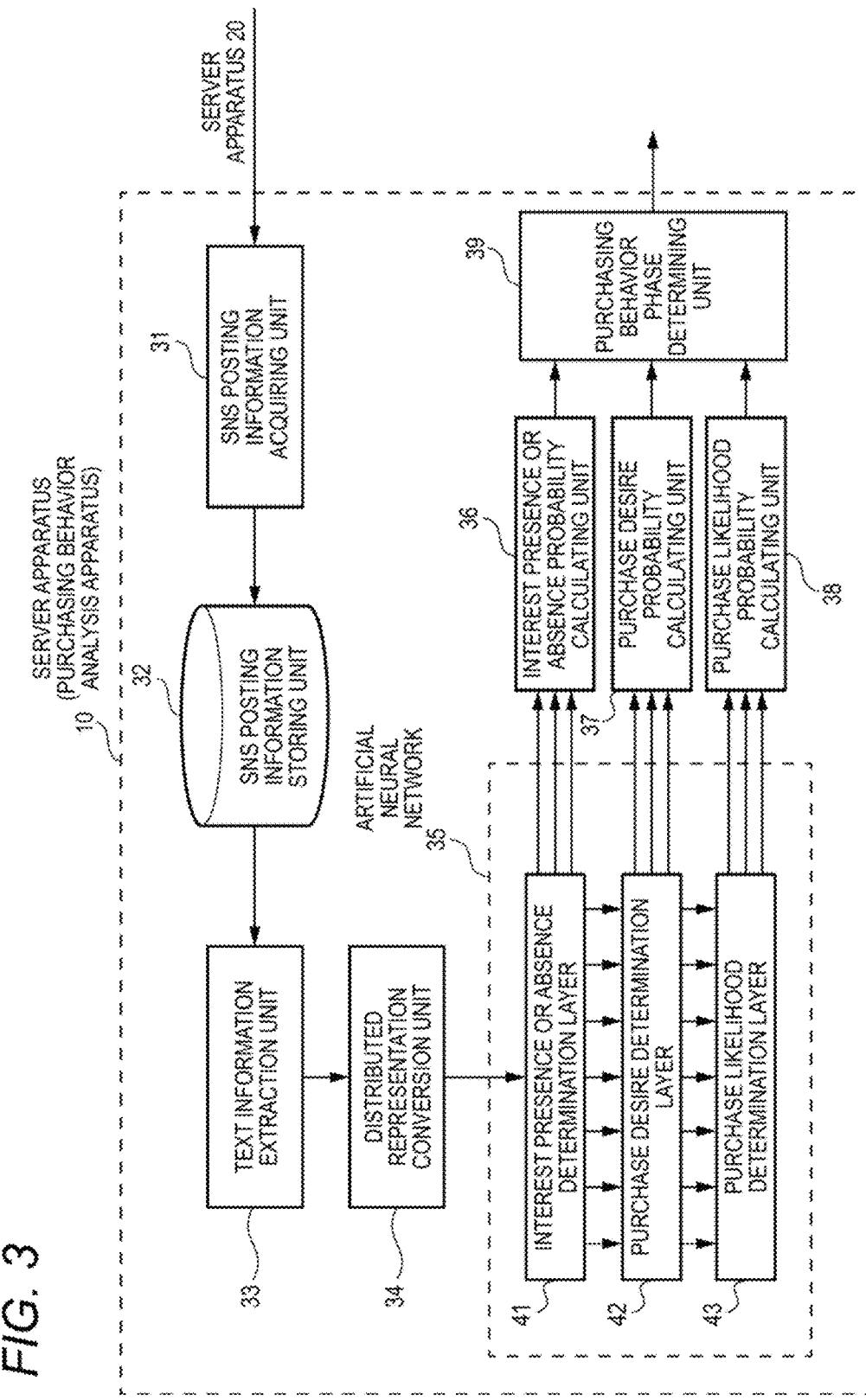
FIG. 3 is a block diagram illustrating the functional structure of the server apparatus (purchasing behavior analysis apparatus) according to the first exemplary embodiment of the invention.

FIG. 3 is a block diagram illustrating the functional structure of the server apparatus 10 implemented by the execution of the control program.

As illustrated in FIG. 3, the server apparatus 10 according to this exemplary embodiment includes an SNS posting information acquiring unit 31, an SNS posting information storing unit 32, a text information extraction unit 33, a distributed representation conversion unit 34, an artificial neural network 35, an interest presence or absence probability calculating unit 36, a purchase desire probability calculating unit 37, a purchase likelihood probability calculating unit 38, and a purchasing behavior phase determining unit 39.

The SNS posting information acquiring unit 31 acquires posting information related to a specific product that is requested to be researched from the information posted to SNS. For example, first, the SNS posting information acquiring unit 31 extracts posts about a specific product from the information posted to SNS and specifies the user who mentions the specific product from the posts. Then, the SNS posting information acquiring unit 31 acquires several to several thousands of posts before and after the post about the specific product in terms of time from a series of information posted by the user until now. As a result, the SNS posting information acquiring unit 31 acquires temporally continuous posting information including several to several thousands of posts about a specific product per user from the posting information of a large number of SNS users.

The SNS posting information storing unit 32 stores the posting information acquired by the SNS posting information acquiring unit 31.

The text information extraction unit 33 extracts text information (document information) included in the posting information from the posting information stored in the SNS posting information storing unit 32.

The distributed representation conversion unit 34 converts the text information which has been extracted from the posting information acquired by the SNS posting information acquiring unit 31 by the text information extraction unit 33 into a distributed representation in which a word or a phrase is represented by a vector. Here, the distributed representation vectorizes a word to represent the word as a sense vector in a multi-dimensional vector space. Here, the distributed representation conversion unit 34 can use, for example, an algorithm using a bag-of-words model or an algorithm using an artificial neural network which is typified by a word2vec model or a paragraph vector in order to convert the posting information into the distributed representation.

The artificial neural network 35 has a structure that simulates the human brain and is a discriminator formed by stacking layers of a large number of logic circuits which simulate the functions of neurons in the human brain.

The artificial neural network 35 includes three layers, that is, an interest presence or absence determination layer 41, a purchase desire determination layer 42, and a purchase likelihood determination layer 43.

The interest presence or absence determination layer 41 is a determination layer that receives the distributed representation converted by the distributed representation conversion unit 34 and determines whether the user is interested in the product mentioned in the posting information. The purchase desire determination layer 42 is a determination layer that receives an output value from the interest presence or absence determination layer 41 and determines whether the user wants the product. The purchase likelihood determination layer 43 is a determination layer that receives an output value from the purchase desire determination layer 42 and determines whether the user is predicted to purchase the product in the future.

Various types of artificial neural networks, such as a feedforward neural network, a recurrent neural network (recursive neural network), and a convolutional neural network), can be used as the artificial neural network 35.

Each of the interest presence or absence determination layer 41, the purchase desire determination layer 42, and the purchase likelihood determination layer 43 performs so-called supervised learning, which is a learning method that receives a teacher signal as a correct answer and performs optimization, to optimize parameters between the logic circuits.

In addition, the artificial neural network 35 includes many logic circuit layers in addition to an input layer and an output layer. Therefore, in the artificial neural network 35 according to this exemplary embodiment, deep learning in which learning is performed in each layer while information is transmitted from the input layer to a deeper layer is performed. In the artificial neural network 35 according to this exemplary embodiment, over-training is prevented and it is possible to achieve high determination accuracy as compared to a case in which the number of layers is small. The artificial neural network 35 will be described in detail below.

The interest presence or absence probability calculating unit 36 calculates a value indicating the probability (degree) that the user will be interested in the product mentioned in the posting information based on the output value from the interest presence or absence determination layer 41.

The purchase desire probability calculating unit 37 calculates a value indicating the probability (degree) that the user will want the product mentioned in the posting information based on the output value from the purchase desire determination layer 42.

The purchase likelihood probability calculating unit 38 calculates a value indicating the probability (degree) that the user will be predicted to purchase the product mentioned in the posting information in the future based on the output value from the purchase likelihood determination layer 43.

For example, a method using an artificial neural network or a method using logistic regression is considered as the method of the interest presence or absence probability calculating unit 36, the purchase desire probability calculating unit 37, and the purchase likelihood probability calculating unit 38 calculating the probability values.

The purchasing behavior phase determining unit 39 determines which of a phase (interest phase) in which the user is interested in the product mentioned in the posting information, a phase (purchase desire phase) in which the user wants the product mentioned in the posting information, and a phase (purchase prediction phase) in which the user is predicted to purchase the product mentioned in the posting information in the future the purchasing behavior phase (purchasing behavior stage) of the user is, based on the probability values calculated by the interest presence or absence probability calculating unit 36, the purchase desire probability calculating unit 37, and the purchase likelihood probability calculating unit 38.

A classification representation which is called AIDMA has been known as a model representing the stage of a psychological process of the consumer for advertisements. AIDMA classifies the psychological process of the consumer into five stages, that is, attention, interest, desire, memory, and action.

In contrast, in the determination of the purchasing behavior phase in this exemplary embodiment, the purchasing behavior phases are classified into three stages, that is, the interest phase, the purchase desire phase, and the purchase prediction phase. Since the artificial neural network 35 operates as a discriminator that performs machine learning, the purchasing behavior phases are classified into three phases so that the discriminator can perform determination with high accuracy. Therefore, the present invention is not limited to the case in which the purchasing behavior phases are classified into three phases and can be applied to a case in which the purchasing behavior phases are classified into five phases as in AIDAM.

FIG. 4 illustrates the correspondence relationship between each process in AIDMA and the purchasing behavior phases in this exemplary embodiment. As illustrated in FIG. 4, the attention process and the interest process in AIDAM correspond to the interest phase in this exemplary embodiment. In addition, the desire process in AIDAM corresponds to the purchase desire phase in this exemplary embodiment. Furthermore, the memory process and the action process in AIDAM correspond to the purchase prediction phase in this exemplary embodiment.

Next, the artificial neural network 35 illustrated in FIG. 3 will be described in detail with reference to FIG. 5.

Figure 5:
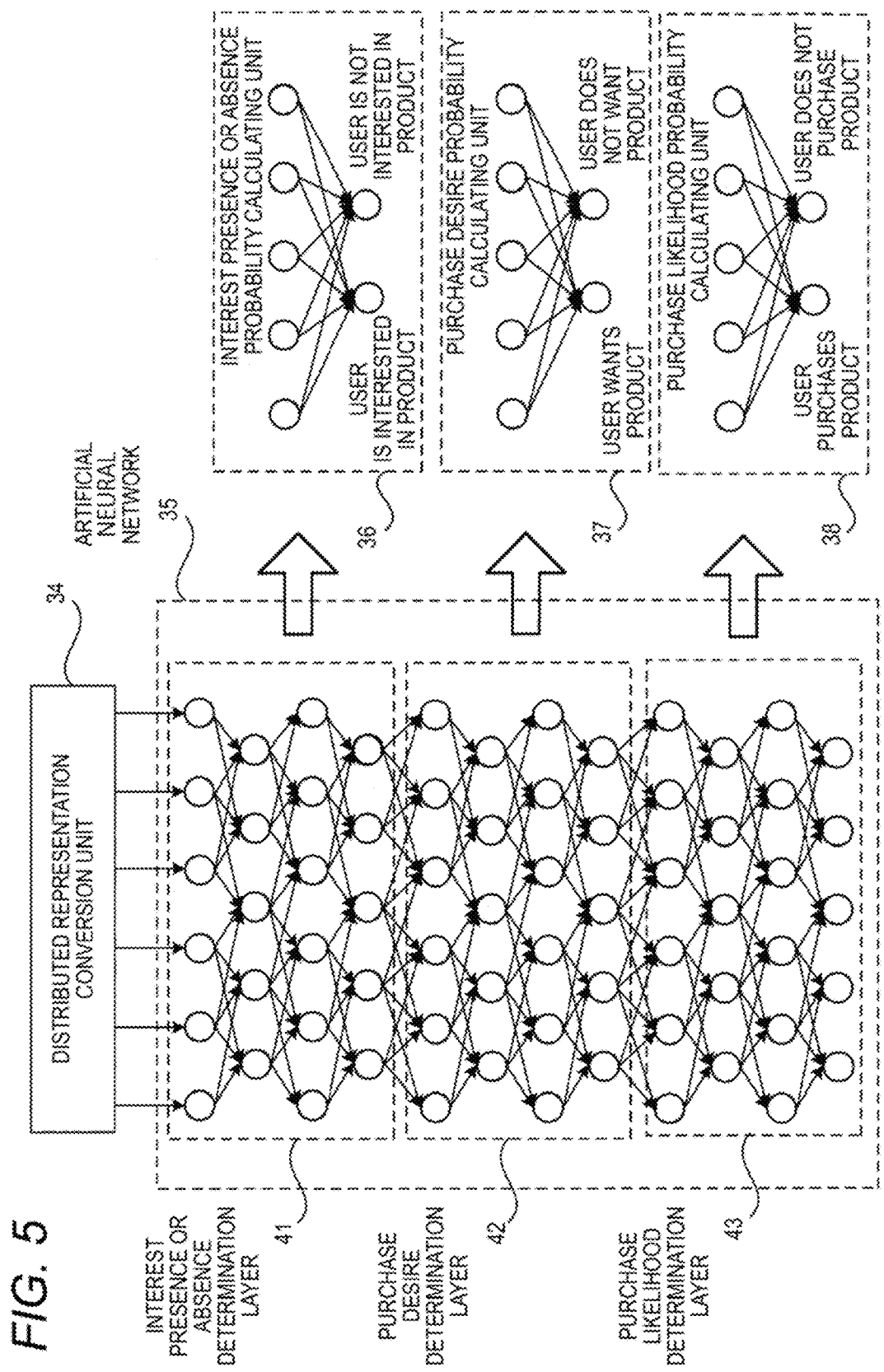
FIG. 5 is a diagram illustrating an artificial neural network illustrated in FIG. 3 in detail.

As illustrated in FIG. 5, the artificial neural network 35 according to this exemplary embodiment is continuously formed by three layers, that is, the interest presence or absence determination layer 41, the purchase desire determination layer 42, and the purchase likelihood determination layer 43, and sequentially determines whether the user who has posted the posting information is interested in a certain product, whether the user wants the product, and whether the probability that the user will purchase the product is high, based on the distributed representation of the posting information input from the distributed representation conversion unit 34.

Each of the interest presence or absence determination layer 41, the purchase desire determination layer 42, and the purchase likelihood determination layer 43 has a structure in which plural layers of logic circuits are connected and is formed by a large number of logic circuit layers in the entire artificial neural network 35.

FIG. 5 schematically illustrates the structure of the artificial neural network 35. However, for example, the number of logic circuits is not limited to the structure illustrated in FIG. 5.

FIG. 5 illustrates the structure of the interest presence or absence probability calculating unit 36, the purchase desire probability calculating unit 37, and the purchase likelihood probability calculating unit 38. The interest presence or absence probability calculating unit 36, the purchase desire probability calculating unit 37, and the purchase likelihood probability calculating unit 38 are each formed by a one-layer network, receive output values from intermediate layers in the presence or absence determination layer 41, the purchase desire determination layer 42, and the purchase likelihood determination layer 43, respectively, aggregate the results, and calculate interest presence or absence probability (the user is interested in the product/is not interested in the product), purchase desire probability (the user wants the product/does not want the product), and purchase likelihood probability (the user purchases the product/does not purchase the product).

However, as can be seen from FIG. 5, in the artificial neural network 35, the intermediate layers do not aggregate the output values and calculate the interest presence or absence probability (the user is interested in the product/is not interested in the product), the purchase desire probability (the user wants the product/does not want the product), and the purchase likelihood probability (the user purchases the product/does not purchase the product).

Therefore, the artificial neural network 35 according to this exemplary embodiment can continuously perform a determination process up to purchase desire possibility determination, based on the distributed representation input from the distributed representation conversion unit 34.

The compatibility between the progress of the user's purchasing behavior in which the user is interested in a certain product, wants to purchase the product, and finally purchases the product and the progress of the artificial neural network 35 is high. Therefore, the structure in which the degree of progress of the user's purchasing behavior is determined using the artificial neural network 35 can be expected to improve the accuracy of determination.

Next, an example of the output of a calculation value from the interest presence or absence probability calculating unit 36 will be described with reference to FIG. 6.

Figure 6:
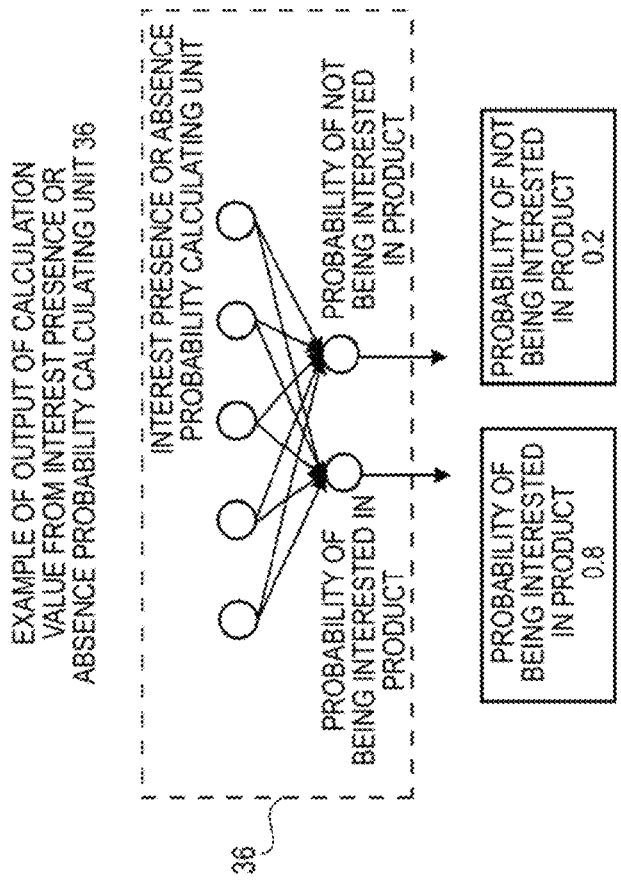
FIG. 6 is a diagram illustrating an example of the output of a calculation value from an interest presence or absence probability calculating unit.

FIG. 6 illustrates an example of outputs in a case in which the interest presence or absence probability calculating unit 36 outputs a value of 0.8 as the probability of "being interested in the product" and a value of 0.2 as the probability of "not being interested in the product". That is, when these values are obtained, it can be presumed that the probability that the user will be interested in the product is 80%.

An example of the output of the calculation values from the purchase desire probability calculating unit 37 and the purchase likelihood probability calculating unit 38 is not illustrated. However, similarly, the calculation values from the purchase desire probability calculating unit 37 and the purchase likelihood probability calculating unit 38 output a value indicating the probability of "wanting the product", a value indicating the probability of "not wanting the product", a value indicating the probability of "purchasing the product", and a value indicating the probability of "not purchasing the product".

Then, the purchasing behavior phase determining unit 39 determines in which of three purchasing behavior phases the user is, based on the output values from the interest presence or absence probability calculating unit 36, the purchase desire probability calculating unit 37, and the purchase likelihood probability calculating unit 38.

Figure 7:
FIG. 7 is a diagram illustrating purchasing behavior phase determination example 1 in a purchasing behavior phase determining unit.
Figure 8:
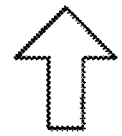
FIG. 8 is a diagram, illustrating purchasing behavior phase determination example 2 in the purchasing behavior phase determining unit.
Figure 9:
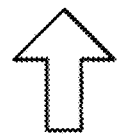
FIG. 9 is a diagram illustrating purchasing behavior phase determination example 3 in the purchasing behavior phase determining unit.

FIGS. 7 to 9 illustrate specific examples of the purchasing behavior phase determination of the purchasing behavior phase determining unit 39.

For example, in purchasing behavior phase determination example 1 illustrated in FIG. 7, as the interest presence or absence probability, output values indicating that the probability of "being interested in the product" is 0.8 and the probability of "not being interested in the product" is 0.2 are obtained. As the purchase desire probability, output values indicating that the probability of "wanting the product" is 0.1 and the probability of "not wanting the product" is 0.9 are obtained. As the purchase likelihood probability, output values indicating that the probability of "purchasing the product" is 0.2 and the probability of "not purchasing the product" is 0.8 are obtained.

Therefore, the purchasing behavior phase determining unit 39 determines that the purchasing behavior phase of the user is the interest phase from these output values. That is, it can be presumed that the user is interested in the product, but does not want to purchase the product.

For example, in purchasing behavior phase determination example 2 illustrated in FIG. 8, as the interest presence or absence probability, output values indicating that the probability of "being interested in the product" is 0.8 and the probability of "not being interested in the product" is 0.2 are obtained. As the purchase desire probability, output values indicating that the probability of "wanting the product" is 0.9 and the probability of "not wanting the product" is 0.1 are obtained. As the purchase likelihood probability, output values indicating that the probability of "purchasing the product" is 0.2 and the probability of "not purchasing the product" is 0.8 are obtained.

Therefore, the purchasing behavior phase determining unit 39 determines that the purchasing behavior phase of the user is the purchase desire phase from these output values. That is, it can be presumed that the user is interested in the product, wants the product, and has not yet determined to purchase the product.

For example, in purchasing behavior phase determination example 3 illustrated in FIG. 9, as the interest presence or absence probability, output values indicating that the probability of "being interested in the product" is 0.8 and the probability of "not being interested in the product" is 0.2 are obtained. As the purchase desire probability, output values indicating that the probability of "wanting the product" is 0.9 and the probability of "not wanting the product" is 0.1 are obtained. As the purchase likelihood probability, output values indicating that the probability of "purchasing the product" is 0.8 and the probability of "not purchasing the product" is 0.2 are obtained.

Therefore, the purchasing behavior phase determining unit 39 determines that the purchasing behavior phase of the user is the purchase prediction phase from these output values. That is, it can be presumed that the user is interested in the product, wants the product, and is likely to purchase the product in the near future.

In this exemplary embodiment, the purchasing behavior phase determining unit 39 determines the purchasing behavior phase of the user.

However, an analyst who makes a market research may determine the purchasing behavior phase of the user based on the output values illustrated in FIGS. 7 to 9. In the structure in which a person determines the purchasing behavior phase of the user, the purchasing behavior phase determining unit 39 is unnecessary.

Figure 10:
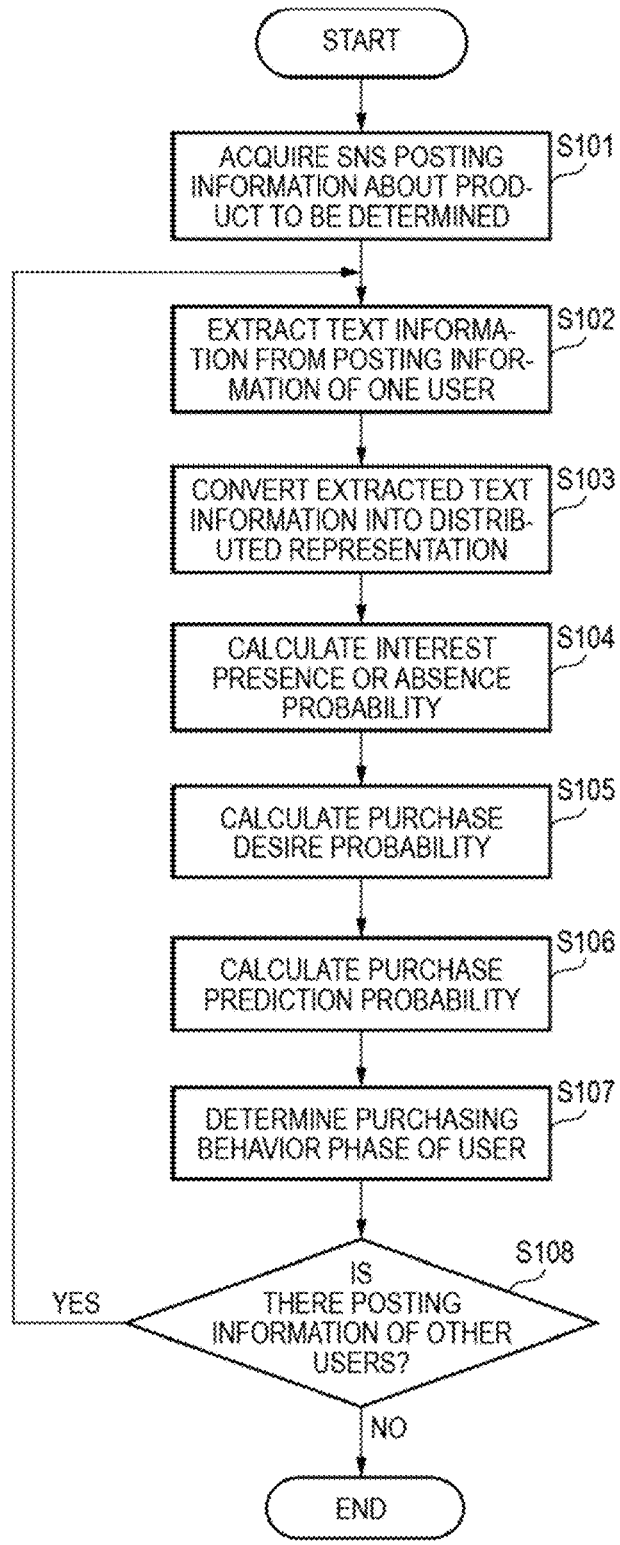
FIG. 10 is a flowchart illustrating the operation of the server apparatus (purchasing behavior analysis apparatus) 10 according to the first exemplary embodiment of the invention.

Next, the operation of the server apparatus (purchasing behavior analysis apparatus) 10 according to this exemplary embodiment will be described with reference to the flowchart illustrated in FIG. 10.

First, when a market research for a certain product is made, the SNS posting information acquiring unit 31 acquires SNS posting information in which the product is mentioned and stores the SNS posting information in the SNS posting information storing unit 32 (Step S101).

Then, the text information extraction unit 33 extracts text information from the SNS posting information of one user stored in the SNS posting information storing unit 32 (Step S102).

Then, the distributed representation conversion unit 34 converts the text information extracted by the text information extraction unit 33 into a vectorized distributed representation (Step S103).

Then, the distributed representation is input to the artificial neural network 35 and a determination process is sequentially performed in the interest presence or absence determination layer 41, the purchase desire determination layer 42, and the purchase likelihood determination layer 43.

Then, the interest presence or absence probability calculating unit 36 calculates interest presence or absence probability based on the output value from the intermediate layer of the artificial neural network 35 (Step S104).

The purchase desire probability calculating unit 37 calculates purchase desire probability based on the output value from the intermediate layer of the artificial neural network 35 (Step S105).

The purchase likelihood probability calculating unit 38 calculates purchase likelihood probability based on the output value from the intermediate layer of the artificial neural network 35 (Step S106).

Finally, the purchasing behavior phase determining unit 39 determines the purchasing behavior phase of the user based on the output values from the interest presence or absence probability calculating unit 36, the purchase desire probability calculating unit 37, and the purchase likelihood probability calculating unit 38 (Step S107).

When the posting information of other users about the product is stored in the SNS posting information storing unit 32 (yes in Step S108), the process from Step S102 to Step S107 is repeated to determine the purchasing behavior phase of the user.

Next, an aspect in which the purchasing behavior phase determination process is performed in the server apparatus 10 according to this exemplary embodiment will be described using a specific example of the SNS posting information illustrated in FIG. 11.

Figure 11:
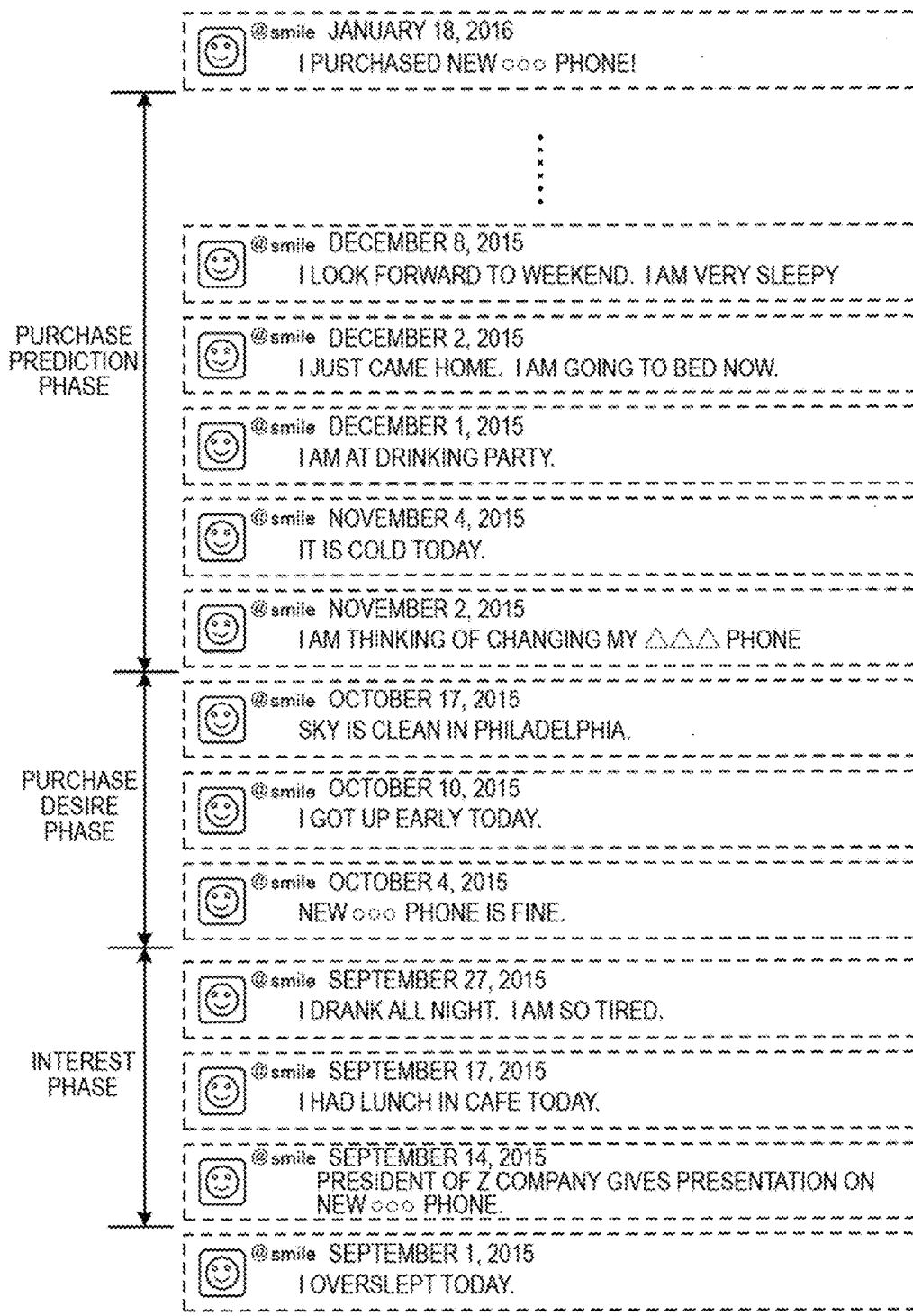
FIG. 11 is a diagram illustrating a specific example of SNS posting information on which a purchasing behavior phase determination process is performed in the server apparatus according to the first exemplary embodiment of the present invention.

The example of the SNS posting information illustrated in FIG. 11 is an example of posting information in Twitter (registered trademark) and the user mentions a smart phone with the name "ooo phone" three times in the posts.

The user posted a message indicating that "the president of a Z company gives a presentation on a new product of the ooo phone" on Sep. 14, 2015. Therefore, it is presumed that the user is interested in the product.

Thereafter, the user posted a message indicating that "the ooo phone is fine" on Oct. 4, 2015. Therefore, it is presumed that the user wants to purchase the product.

In addition, the user posted a message indicating that "I am thinking of changing my ΔΔΔ phone" on Nov. 2, 2015. Therefore, it is presumed that the user considers the replacement of the smart phone and wants to purchase the ooo phone.

When the purchasing behavior phase of the user is determined from the posting information in which a specific product is mentioned, first, the server apparatus 10 according to this exemplary embodiment determines whether the user is interested in the product and determines whether the user wants to purchase the product. Finally, the server apparatus 10 determines whether the probability that the user will purchase the product in the future is high.

When the purchasing behavior phase is determined based on the content of the posting information posted by the user until Dec. 8, 2015, it is determined that the user is in the purchase prediction phase in which the user is interested in the ooo phone, wants the ooo phone, and is likely to purchase the ooo phone in the near future.

When the purchasing behavior phase is determined based on the posting information posted until Oct. 17, 2015, the user is interested in the ooo phone and wants the ooo phone, but it is not presumed that the user will purchase the ooo phone in the near future. Therefore, it is determined that the purchasing behavior phase of the user is the purchase desire phase.

When the purchasing behavior phase is determined based on the posting information posted until Sep. 27, 2015, the user is interested in the ooo phone, but does not want the ooo phone and it is not presumed that the user will purchase the ooo phone in the near future. Therefore, it is determined that the purchasing behavior phase of the user is the interest phase.

As such, in the purchasing behavior phase determination process according to this exemplary embodiment, the determination result varies with a change in the state of mind of the user over time.

In this exemplary embodiment, the purchasing behavior phase is determined from three phases, that is, the interest phase, the purchase desire phase, and the purchase prediction phase. However, for example, in the case of an inexpensive product, in many cases, immediately after the user is interested in the product, the user determines whether to purchase the product. In addition, it is assumed that some users post a message indicating that the users want to purchase the product without any advance notice.

Therefore, in some cases, the determination result that is more matched with the actual content of posts is obtained from two purchasing behavior phases than three purchasing behavior phases, according to the characteristics of products or the characteristics of SNS.

Figure 12:
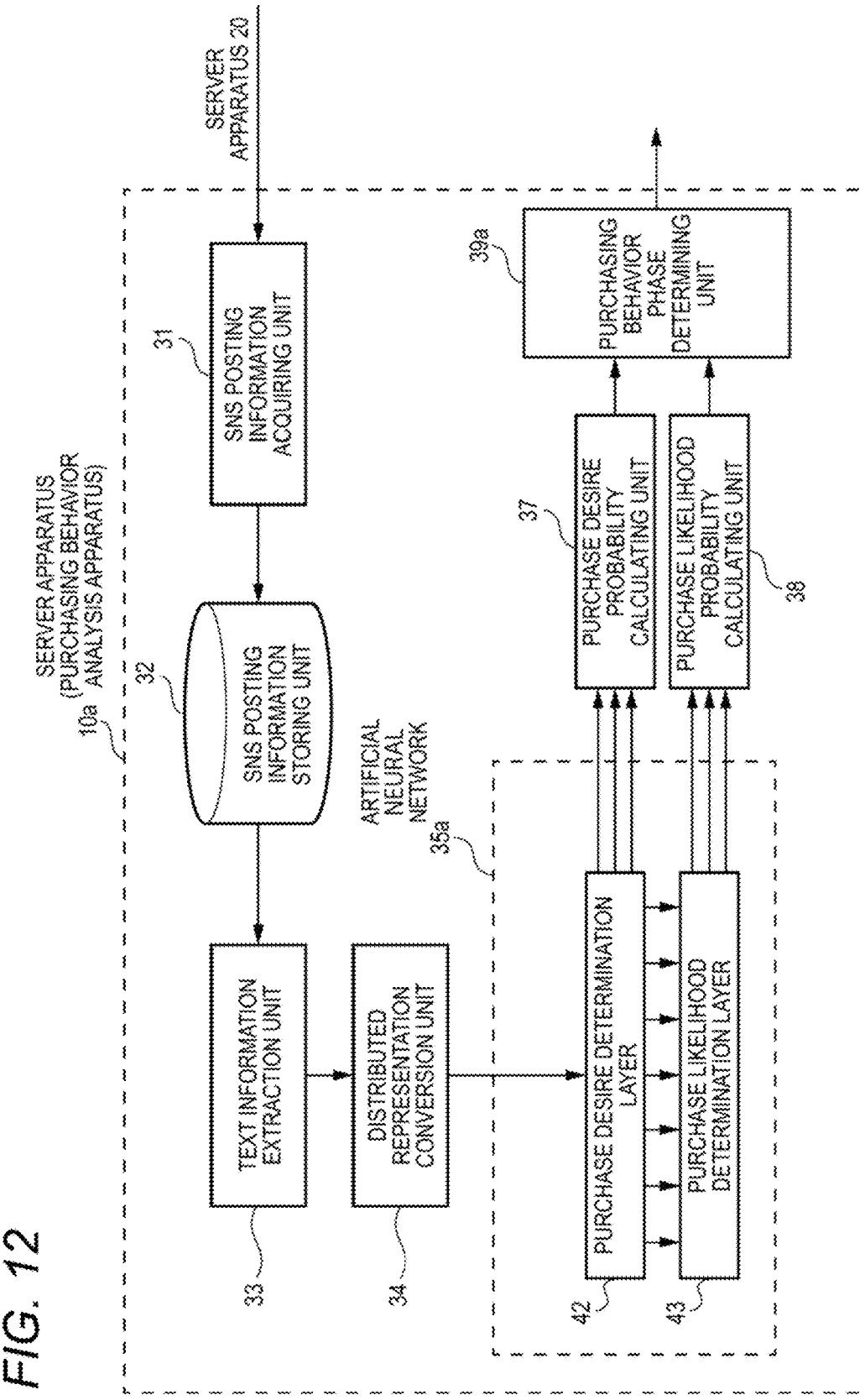
FIG. 12 is a block diagram illustrating the functional structure of a server apparatus (purchasing behavior analysis apparatus) when purchasing behavior determination for two purchasing behavior phases is performed.
Figure 13:
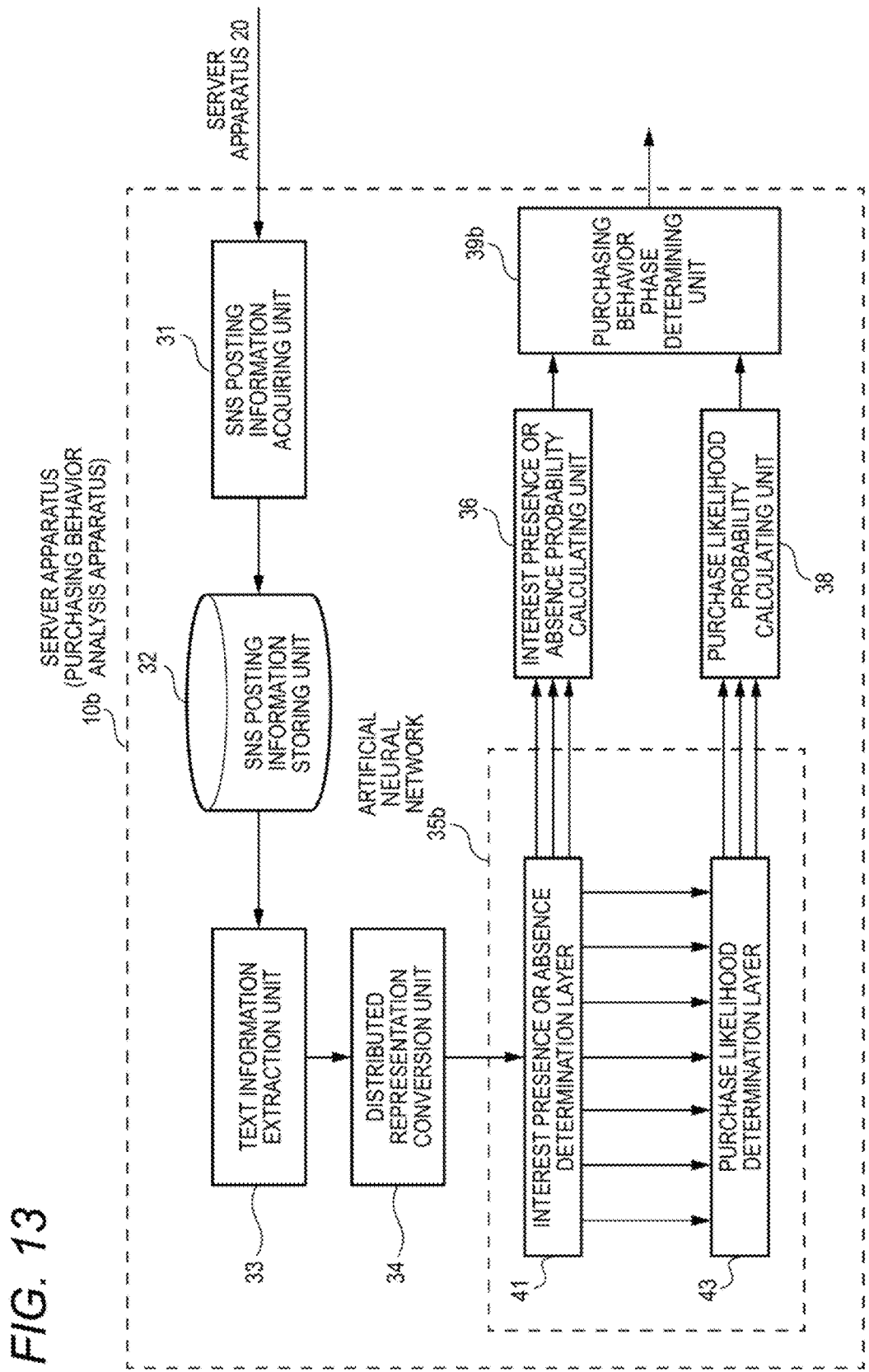
FIG. 13 is a block diagram illustrating the functional structure of a server apparatus (purchasing behavior analysis apparatus) when purchasing behavior determination for two purchasing behavior phases is performed.

FIGS. 12 and 13 illustrate structures when purchasing behavior determination for two purchasing behavior phases is performed.

A server apparatus (purchasing behavior analysis apparatus) 10*a* illustrated in FIG. 12 differs from the server apparatus 10 illustrated in FIG. 3 in that the interest presence or absence probability calculating unit 36 is removed, the artificial neural network 35 is replaced with an artificial neural network 35*a*, and the purchasing behavior phase determining unit 39 is replaced with a purchasing behavior phase determining unit 39*a*.

The artificial neural network 35*a* differs from the artificial neural network 35 in the structure illustrated in FIG. 3 in that the interest presence or absence determination layer 41 is removed.

In the structure illustrated in FIG. 12, the purchase desire determination layer 42 receives the distributed representation converted by the distributed representation conversion unit 34 and determines whether the user wants to purchase the product.

In the structure illustrated in FIG. 12, the purchasing behavior phase determining unit 39*a* determines which of the phase (purchase desire phase) in which the user wants the product mentioned in the posting information and the phase (purchase prediction phase) in which the user is predicted to purchase the product mentioned in the posting information in the future the purchasing behavior phase (purchasing behavior stage) of the user is, based on the probability values calculated by the purchase desire probability calculating unit 37 and the purchase likelihood probability calculating unit 38.

A server apparatus (purchasing behavior analysis apparatus) 10*b* illustrated in FIG. 13 differs from the server apparatus 10 illustrated in FIG. 3 in that the purchase desire probability calculating unit 37 is removed, the artificial neural network 35 is replaced with an artificial neural network 35*b*, and the purchasing behavior phase determining unit 39 is replaced with a purchasing behavior phase determining unit 39*b*.

The artificial neural network 35*b* differs from the artificial neural network 35 in the structure illustrated in FIG. 3 in that the purchase desire determination layer 42 is removed.

In the structure illustrated in FIG. 13, the purchase likelihood determination layer 43 receives an output value from the interest presence or absence determination layer 41 and determines whether the user is predicted to purchase the product in the future.

In the structure illustrated in FIG. 13, the purchasing behavior phase determining unit 39*b* determines which of the phase (interest phase) in which the user is interested in the product mentioned in the posting information and the phase (purchase prediction phase) in which the user is predicted to purchase the product mentioned in the posting information in the future the purchasing behavior phase (purchasing behavior stage) of the user is, based on the probability values calculated by the interest presence or absence probability calculating unit 36 and the purchase likelihood probability calculating unit 38.

According to the purchasing behavior analysis apparatus according to this exemplary embodiment, it is possible to determine in which of plural purchasing behavior phases the user is for a specific product. Therefore, it is possible to distribute advertisements corresponding to the purchasing behavior phase of the user.

For example, when a user is determined to be likely to purchase a smart phone manufactured by a certain company, it is possible to distribute advertisements for a store that sells the product to the user. Conversely, when a user is somewhat interested in the smart phone, it is possible to distribute advertisements for the smart phones manufactured by each company to the user.

In addition, an SNS user who has posted information about a certain product may be extracted and it may be determined in which of the interest phase, the purchase desire phase, and the purchase likelihood phase each user is. In this case, it is possible to predict the future demand of the product.

Furthermore, the transition of the purchasing behavior phase of each user may be tracked. When the user who is in the interest phase does not move to the purchase desire phase or the purchase prediction phase and does not reach a product purchase stage or when the user who is in the purchase desire phase does not move to the purchase prediction phase and does not reach the product purchase stage, the cause of stopping the purchase may be investigated and information that can be used to develop products in the future may be collected.

[Second Exemplary Embodiment]

Next, a purchasing behavior analysis apparatus according to a second exemplary embodiment of the present invention will be described.

The purchasing behavior analysis apparatus according to the first exemplary embodiment can determine the purchasing behavior phase of the user for a specific product. In contrast, the purchasing behavior analysis apparatus according to the second exemplary embodiment of the present invention can determine the purchasing behavior phase of the user for each of plural predetermined product categories (product classifications).

Figure 14:
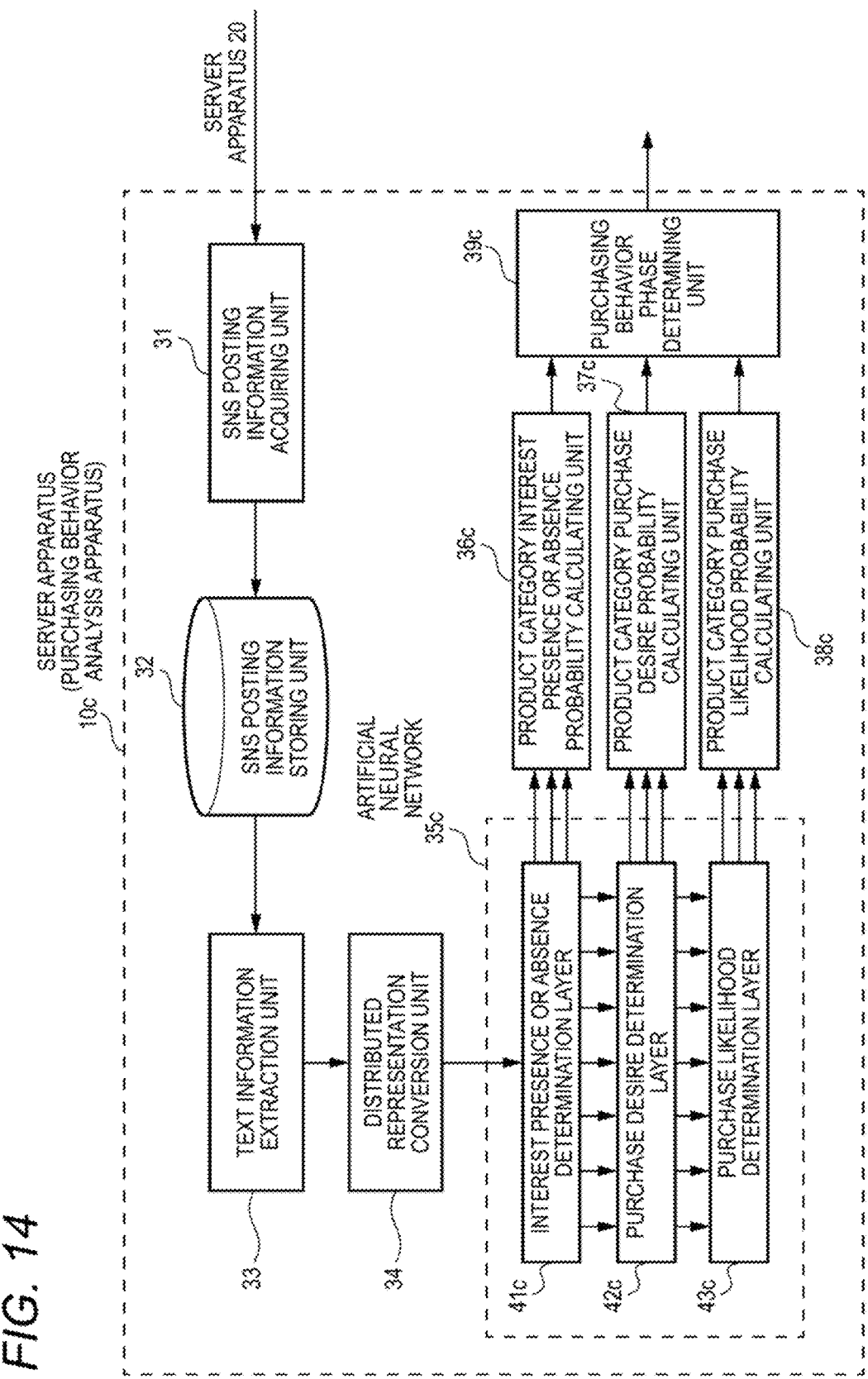
FIG. 14 is a block diagram illustrating the functional structure of a server apparatus which is a purchasing behavior analysis apparatus according to a second exemplary embodiment of the invention.

FIG. 14 is a block diagram illustrating the functional structure of a server apparatus 10c which is the purchasing behavior analysis apparatus according to the second exemplary embodiment of the present invention.

The server apparatus (purchasing behavior analysis apparatus) 10c according to this exemplary embodiment differs from the server apparatus 10 according to the first exemplary embodiment illustrated in FIG. 3 in that the artificial neural network 35, the interest presence or absence probability calculating unit 36, the purchase desire probability calculating unit 37, the purchase likelihood probability calculating unit 38, and the purchasing behavior phase determining unit 39 are replaced with an artificial neural network 35c, a product category interest presence or absence probability calculating unit 36c, a product category purchase desire probability calculating unit 37c, a product category purchase likelihood probability calculating unit 38c, and a purchasing behavior phase determining unit 39c, respectively.

The artificial neural network 35c according to this exemplary embodiment includes an interest presence or absence determination layer 41c, a purchase desire determination layer 42c, and a purchase likelihood determination layer 43c.

The interest presence or absence determination layer 41c is a determination layer that receives the distributed representation converted by the distributed representation conversion unit 34 and determines which of plural predetermined product categories (product classifications) the user is interested in.

The purchase desire determination layer 42c is a determination layer that receives an output value from the interest presence or absence determination layer 41c and determines in which of plural product categories the user wants to purchase a product.

The purchase likelihood determination layer 43c is a determination layer that receives an output value from the purchase desire determination layer 42c and determines in which of plural product categories the user is predicted to purchase a product in the future.

The product category interest presence or absence probability calculating unit 36c calculates a value indicating the probability that the user will be interested in each of plural product categories based on an output value from the interest presence or absence determination layer 41c.

The product category purchase desire probability calculating unit 37c calculates a value indicating the probability that the user will want a product in each of plural product categories based on an output value from the purchase desire determination layer 42c.

The product category purchase likelihood probability calculating unit 38c calculates a value indicating the probability that the user will purchase a product in each of plural product categories in the future based on an output value from the purchase likelihood determination layer 43c.

Next, an example of the output of the calculation value from the product category interest presence or absence probability calculating unit 36c will be described with reference to FIG. 15. In the following description, it is assumed that four product categories, that is, "cars", "smart phones", "home appliances", and "cameras" are preset.

Figure 15:
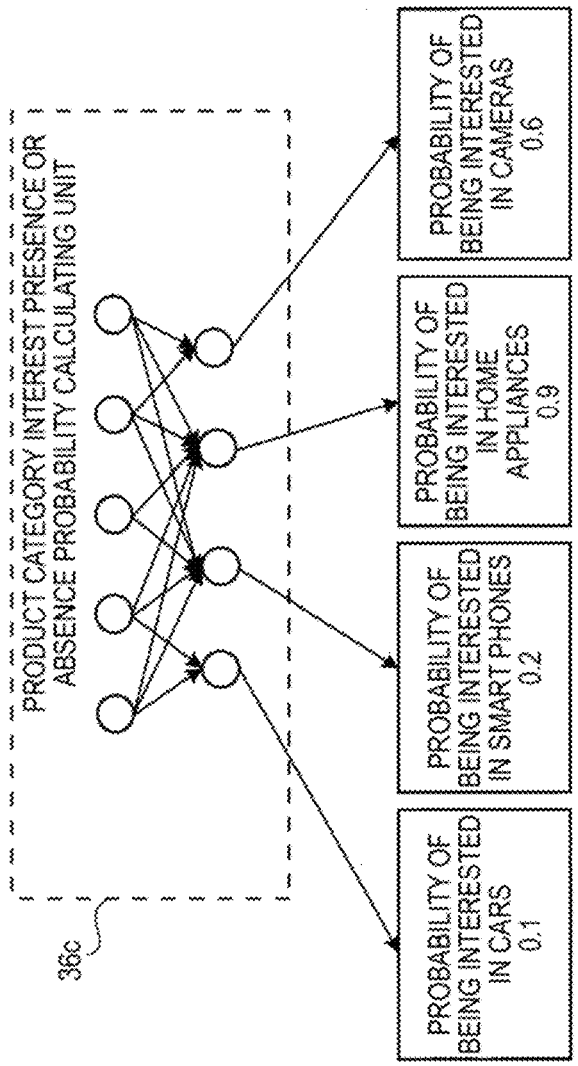
FIG. 15 is a diagram illustrating an example of the output of a calculation value from a product category interest presence or absence probability calculating unit.

FIG. 15 illustrates an example of outputs in a case in which the interest presence or absence probability calculating unit 36c outputs a value of 0.1 as the probability "being interested in cars", outputs a value of 0.2 as the probability "being interested in smart phones", outputs a value of 0.9 as the probability "being interested in home appliances", and outputs a value of 0.6 as the probability "being interested in cameras". That is, when these values are obtained, it can be presumed that the probability that the user will be interested in home appliances is 90% and the probability that the user will be interested in cameras is 60%. Conversely, it can be presumed that the probability that the user will not be interested in cars is 90% (1−0.1=0.9) and the probability that the user will not be interested in smart phones is 20% (1−0.8=0.2).

Examples of the output of the calculation values from the purchase desire probability calculating unit 37 and the purchase likelihood probability calculating unit 38 are not illustrated. However, similarly, the probability of "wanting products" in each product category and the probability of "purchasing the products" are output.

The purchasing behavior phase determination unit 39c determines which of the phase (interest phase) in which the user is interested in each product category, the phase (purchase desire phase) in which the user wants the product in each product category, and the phase (purchase prediction phase) in which the user is predicted to purchase the product in the future the purchasing behavior phase of the user is, based on the probability values calculated by the product category interest presence or absence probability calculating unit 36c, the product category purchase desire probability calculating unit 37c, and the product category purchase likelihood probability calculating unit 38c.

According to the purchasing behavior analysis apparatus of this exemplary embodiment, it is possible to effectively distribute advertisements corresponding to the purchasing behavior phases, that is, the phase in which each user is interested in the product, the phase in which each user wants to purchase the product, and the phase in which each user is predicted to purchase the product in the future. For example, it is more effective to distribute home appliance advertisements to the user corresponding to the output values illustrated in FIG. 15 than to distribute car advertisements.

In addition, it is possible to distribute advertisements corresponding to the purchasing behavior phase of the user. For example, advertisements for car insurance are distributed to the user in the purchase prediction phase in which the user is predicted to purchase a car or advertisements for smart phones are distributed to the user who is interested in smart phones.

In addition, plural users under specific conditions may be extracted. For example, the user who has participated in a specific event or the user who has watched a television program in a specific field may be extracted. Then, it may be examined in which category of products each user is interested and whether each user is likely to purchase the products. In this case, it is possible to obtain information for examining effective advertisement distribution to target users and for examining which television programs commercials are effective for.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A purchasing behavior analysis apparatus comprising:
a CPU configured to:
acquire posting information about a specific product from posting information posted to a social networking service; and
convert document information included in the acquired posting information into a distributed representation; and
an artificial neural network that comprises:
a first determination layer which receives the distributed representation and determines whether a user is interested in the product mentioned in the posting information;
a second determination layer which receives an output value from the first determination layer and determines whether the user wants the product; and
a third determination layer which receives an output value from the second determination layer and determines whether the user is predicted to purchase the product in the future, wherein:
each of the first determination layer, the second determination layer, and the third determination layer is configured to perform supervised learning whereby parameters of the artificial neural network are optimized based on a received teacher signal that indicates a correct answer; and
the CPU is further configured to:
calculate a value indicating probability that the user will be interested in the product mentioned in the posting information based on the output value from the first determination layer;
calculate a value indicating probability that the user will want the product mentioned in the posting information based on the output value from the second determination layer;
calculate a value indicating probability that the user will be predicted to purchase the product mentioned in the posting information in the future based on an output value from the third determination layer; and
determine, based on each of the calculated values, at which of the following purchasing behavior phases is the user: (i) a phase in which the user is interested in the product mentioned in the posting information, (ii) a phase in which the user wants the product mentioned in the posting information, and (iii) a phase in which the user is predicted to purchase the product mentioned in the posting information in the future.

2. A purchasing behavior analysis apparatus comprising:
a CPU configured to:
acquire posting information about a specific product from posting information posted to a social networking service;
convert document information included in the acquired posting information into a distributed representation; and
an artificial neural network that comprises:
a first determination layer which receives the distributed representation and determines whether a user wants the product mentioned in the posting information; and
a second determination layer which receives an output value from the first determination layer and determines whether the user is predicted to purchase the product in the future, wherein:
each of the first determination layer and the second determination layer is configured to perform supervised learning whereby parameters of the artificial neural network are optimized based on a received teacher signal that indicates a correct answer; and
the CPU is further configured to:
calculate a value indicating probability that the user will want the product mentioned in the posting information based on the output value from the first determination layer;
calculate a value indicating probability that the user will be predicted to purchase the product mentioned in the posting information in the future based on an output value from the second determination layer; and
determine, based on each of the calculated values, at which of the following purchasing behavior phases is the user: (i) a phase in which the user wants the product mentioned in the posting information and (ii) a phase in which the user is predicted to purchase the product mentioned in the posting information in the future.

3. A purchasing behavior analysis apparatus comprising:
a CPU configured to:
acquire posting information about a specific product from posting information posted to a social networking service;
convert document information included in the acquired posting information into a distributed representation; and an artificial neural network that comprises:
- a first determination layer which receives the distributed representation and determines whether a user is interested in the product mentioned in the posting information; and
- a second determination layer which receives an output value from the first determination layer and determines whether the user is predicted to purchase the product in the future, wherein:

each of the first determination layer and the second determination layer is configured to perform supervised learning whereby parameters of the artificial neural network are optimized based on a received teacher signal that indicates a correct answer; and the CPU is further configured to:
- calculate a value indicating probability that the user will be interested in the product mentioned in the posting information based on the output value from the first determination layer;
- calculate a value indicating probability that the user will be predicted to purchase the product mentioned in the posting information in the future based on an output value from the second determination layer; and
- determine, based on each of the calculated values, at which of the following purchasing behavior phases is the user: (i) a phase in which the user is interested in the product mentioned in the posting information and (ii) a phase in which the user is predicted to purchase the product mentioned in the posting information in the future.

4. A purchasing behavior analysis apparatus comprising:
a CPU configured to:
- acquire posting information about a specific product from posting information posted to a social networking service;
- convert document information included in the acquired posting information into a distributed representation; and an artificial neural network that comprises:
- a first determination layer which receives the distributed representation and determines in which of plural predetermined product categories a user is interested;
- a second determination layer which receives an output value from the first determination layer and determines in which of the plural product categories the user wants a product; and
- a third determination layer which receives an output value from the second determination layer and determines in which of the plural product categories the user is predicted to purchase the product in the future, wherein:

each of the first determination layer, the second determination layer, and the third determination layer is configured to perform supervised learning whereby parameters of the artificial neural network are optimized based on a received teacher signal that indicates a correct answer; and the CPU is further configured to:
- calculate a value indicating probability that the user will be interested in each of the plural product categories based on the output value from the first determination layer;
- calculate a value indicating probability that the user will want the products in each of the plural product categories based on the output value from the second determination layer;
- calculate a value indicating probability that the user will be predicted to purchase the products in each of the plural product categories in the future based on an output value from the third determination layer; and
- determine, based on each of the calculated values, at which of the following purchasing behavior phases is the user: (i) a phase in which the user is interested in each of the plural product categories, (ii) a phase in which the user wants the products in each of the plural product categories, and (iii) a phase in which the user is predicted to purchase the products in each of the plural product categories in the future.

5. A non-transitory computer readable medium storing a program that causes a computer to perform:
- acquiring posting information about a specific product from posting information posted to a social networking service;
- converting document information included in the acquired posting information into a distributed representation;
- calculating a value indicating probability that a user will be interested in the product mentioned in the posting information based on an output value from a first determination layer in an artificial neural network including:
  - the first determination layer which receives the distributed representation that is converted and determines whether the user is interested in the product mentioned in the posting information;
  - a second determination layer which receives the output value from the first determination layer and determines whether the user wants the product; and
  - a third determination layer which receives an output value from the second determination layer and determines whether the user is predicted to purchase the product in the future;
- calculating a value indicating probability that the user will want the product mentioned in the posting information based on the output value from the second determination layer; and
- calculating a value indicating probability that the user will be predicted to purchase the product mentioned in the posting information in the future based on an output value from the third determination layer, wherein each of the first determination layer, the second determination layer, and the third determination layer is configured to perform supervised learning whereby parameters of the artificial neural network are optimized based on a received teacher signal that indicates a correct answer.

6. The purchasing behavior analysis apparatus of claim 1, wherein the artificial neural network is further configured to perform deep learning, in which learning is performed in each layer of the network while information is transmitted from an input layer to a deeper layer of the network.

* * * * *